Nov. 30, 1954  W. E. BROWN  2,695,514
DEW POINT INDICATOR
Filed March 18, 1949  3 Sheets-Sheet 1
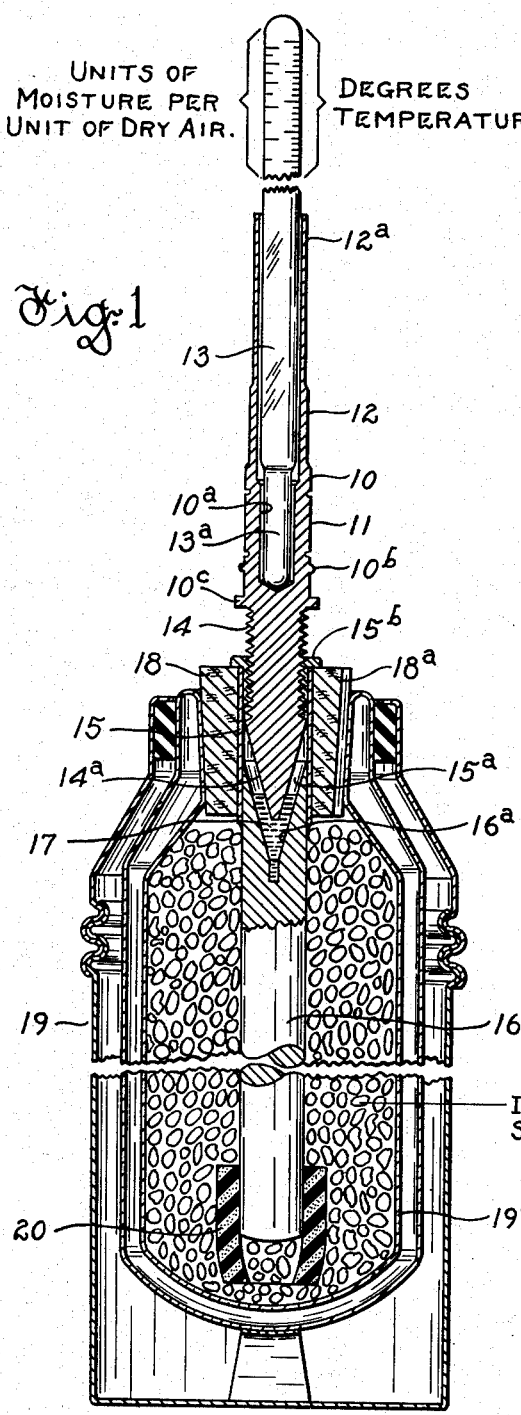
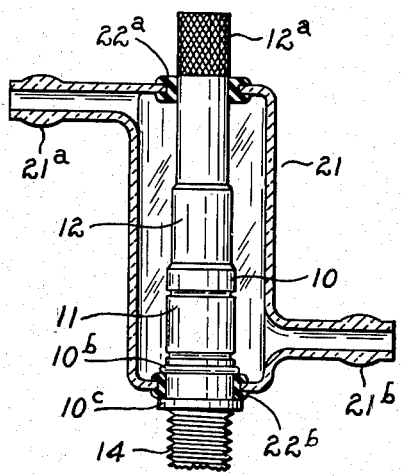
Inventor
William E. Brown
By W. C. Lyon
Attorney

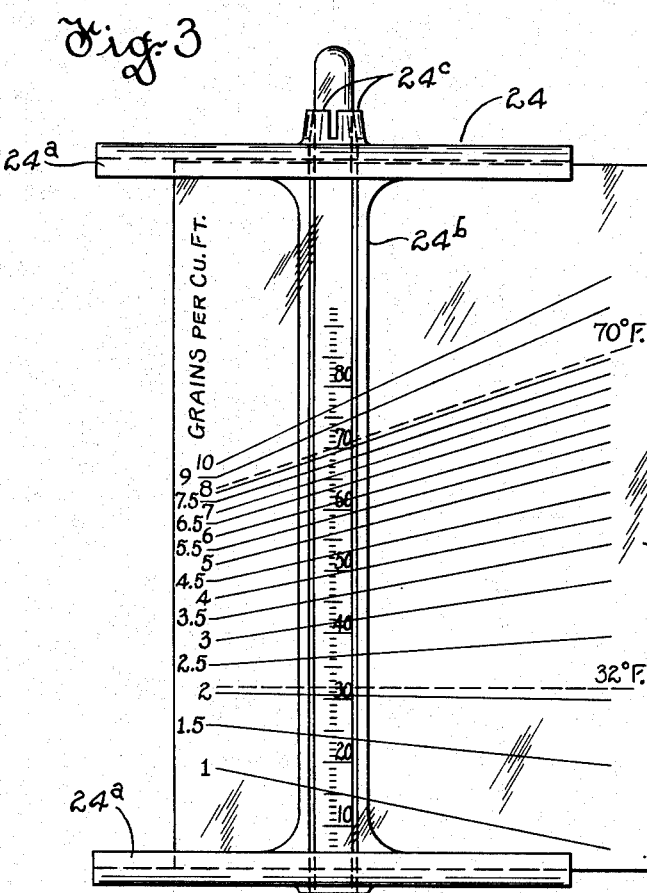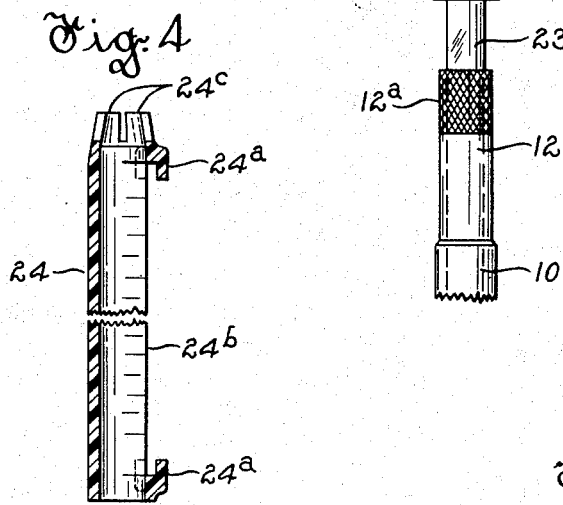

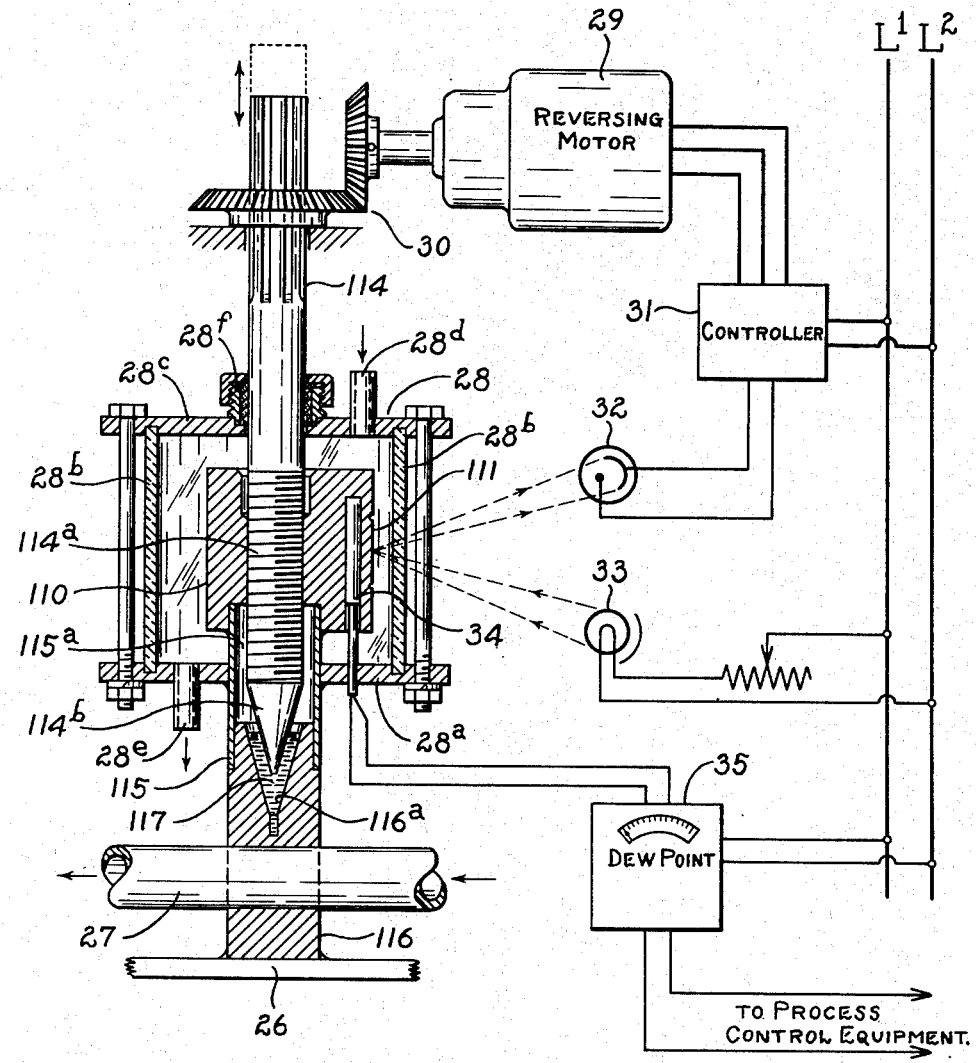

United States Patent Office 2,695,514
Patented Nov. 30, 1954

2,695,514

DEW POINT INDICATOR

William E. Brown, Pewaukee, Wis., assignor to Cutler-Hammer, Inc., Milwaukee, Wis., a corporation of Delaware Application March 18, 1949, Serial No. 82,154

17 Claims. (Cl. 73—17)

This invention relates to apparatus for determining the moisture concentration of a gas by ascertaining its dew point temperature, and more particularly to improvements in apparatus of the character described utilizing the condensation method of dew point determination.

A primary object of the invention is to provide an extremely simple, accurate, and inexpensive apparatus of the aforementioned character.

Another object is to provide apparatus from which the absolute humidity of a gas as well as its dew point temperature may be read directly without resort to separate tables or charts.

Another object is the provision of an apparatus of the aforementioned character which may consist of a single, small and readily portable unit.

Another object is to provide such an apparatus wherein the necessity for use of electrical power for operation thereof is avoided.

Another and more specific object is to provide a novel and simple form of thermal valve.

Another object is to provide improved apparatus for automatically controlling the operation of the aforementioned thermal valve.

Various other objects and advantages will hereinafter appear.

The accompanying drawings illustrate certain embodiments of the invention which will now be described, it being understood that various modifications may be made in the embodiments illustrated without departing from the scope of the appended claims.

In the drawings,

Figure 1 is a center line vertical sectional view of a portable embodiment of the invention, certain parts thereof being shown in elevation.

Fig. 2 illustrates a transparent jacket which may be employed in conjunction with the apparatus shown in Fig. 1, the jacket assembly being shown in vertical section, the remainder being shown in elevation.

Fig. 3 illustrates an adapter which may be used in conjunction with any one of a number of ordinary thermometers which may be employed in lieu of the special thermometer shown in Fig. 1.

Fig. 4 is a vertical sectional view of a portion of the adapter illustrated in Fig. 3.

Fig. 5 is a schematic and diagrammatic illustration of an automatically operable apparatus embodying the invention.

Referring to Fig. 1, the reference numeral 10 designates a supporting member formed of material of relatively high thermal conductivity, such as copper, having a highly polished specular surface 11, the same preferably being chromium plated before polishing. Formed integrally with member 10 is a temperature gradient sleeve portion 12 of like thermal conductivity for enclosing the stem of a thermometer 13 with a relatively close fit for maintaining the immersion length at which the thermometer is calibrated at substantially the same temperature as its bulb 13a, the latter being seated in a cavity 10a in member 10, said cavity 10a being only slightly larger than the bulb of the thermometer and being located adjacent the specular surface 11 so as to maintain the thermometer bulb 13a at substantially the same temperature as the specular surface 11.

The specular surface 11, as will be apparent, is arranged so as to present itself to the ambient atmosphere and to be readily visible so that any deposition of moisture particles or droplets will alter its degree of reflectivity and disperse the rays of light incident to the specular surface to render any change in condition of good contrast to the unaided eye.

Member 10 is further provided at one end thereof with an integrally formed externally threaded thermal gradient bar or screw portion 14, said member 10 and screw 14 being, as aforestated, of high thermal conductivity and of relatively large cross section so as to obtain substantially zero temperature gradient beneath the specular surface 11.

Screw 14 is adapted for threading into an internally threaded collar 15b rigidly attached to a sleeve member 15, the latter having rigidly attached to the lower end thereof a conductor rod 16 of relatively high thermal conductivity, said member 15 being mechanically strong but of poor thermal conductivity, as, for example, of stainless steel. The attachment of rod 16 to sleeve 15 is such as to produce a hermetic seal, while the connection between sleeve 15 and collar 15b similarly results in a hermetic seal, thus to provide a thermal insulating cavity 15a sealed at both ends.

The lower end of screw 14 may be tapered as at 14a and a correspondingly shaped recess 16a may be provided in the upper end of rod 16 to increase the possible area of contact therebetween to thereby increase thermal conductivity between members 14 and 16. For the same purpose a coupling medium 17, either a gas or a partially filling body of liquid, as for example, mineral oil, or a semi-solid material, may be employed; cavity 15a serving additionally as an overflow reservoir for the coupling medium 17.

As will be apparent, the assembly immediately aforedescribed provides for a greater or lesser degree of proximity between screw 14 and rod 16, sleeve 15 and cavity 15a providing a degree of thermal insulation between screw 14 and rod 16 depending upon the degree of proximity of the former to the latter, the turning of screw 14 permitting variation of the coupling rate.

As shown in Fig. 1, the aforedescribed assembly is supported by an insulating cork 18 fitting tightly about member 15 and inserted into the open end of an ordinary thermos bottle or Dewar flask 19 into which a cooling medium such as ice or solid carbon dioxide, for example, has been introduced, rod 16 being immersed in the aforementioned cooling medium. The lower end of rod 16 preferably is provided with a sleeve-like cushioning member 20 of rubber or the like for prevention of possible breakage of the inner lining 19a of thermos bottle 19 by direct contact with rod 16. Cork 18 is further provided with a vent 18a to provide for escape of gases from the thermos bottle.

As will be obvious to those skilled in the art, in lieu of a thermos bottle containing a cooling medium, rod 16 might be subjected to an alternative source of "cold" such as a brine or refrigerant line (as shown, for example, in Fig. 5) or to an expansion valve for use with highly compressed vaporizing material such as liquid carbon dioxide.

In operation screw portion 14 may be rotated manually by grasping and turning a knurled portion 12a (Fig. 2) of the assembly to cause said portion 14 to screw downwardly through cavity 15a until its tapered end 14a attains the desired degree of proximity to rod 16 whereupon screw 14 loses heat to rod 16 and thence to the cooling medium contained in the thermos bottle. The temperature of specular surface 11 is permitted to drop until dew just begins to form thereon. The assembly is then screwed out or uncoupled just to the point at which it is observed that no change takes place in the formation of dew on the specular surface 11. At this point the temperature is neither rising nor falling and since moisture and atmosphere are also in equilibrium, the temperature which may be read on thermometer 13 is the dew point temperature. As illustrated in Fig. 1, thermometer 13 may be calibrated on one side thereof in degrees of temperature and on the other side thereof in units of moisture per unit of dry air thus (due to the one-to-one correspondence between dew point and absolute humidity) to read directly the absolute humidity.

If desired, a thermal insulating sleeve (not shown)

of felt or spongy material of good insulating quality may be slipped over the end of the sleeve portion 12 to maintain the latter at substantially the same temperature as the lower portion of member 10 and its specular surface 11 to meet the immersion length requirements of various thermometers and to provide means for rotating portion 12 by the fingers without materially affecting the temperature of the latter.

In Fig. 2 is illustrated a transparent jack 21, glass, for example, which may be attached to the assembly if the determination of the dew point temperature of a gas other than the ambient atmosphere is desired. Jacket 21 is adapted to be slipped over the end of portion 12 to enclose member 10 and its specular surface 11, grommets 22$^a$ and 22$^b$ of elastic rubber or the like being provided to maintain a substantially air tight seal therebetween. Member 10 is provided with a pair of outwardly extending flanges 10$^b$ and 10$^c$ to aid in positioning jacket 21 in respect thereto and preventing displacement of grommet 22$^b$, positioned between said flanges. Jacket 21 is further provided with an inlet nipple 21$^a$ and an outlet nipple 21$^b$ so arranged vertically with respect to one another that the chilling effect of member 10 on the gas under test will result in convection currents establishing a flow from inlet nipple 21$^a$ to outlet nipple 21$^b$ thus to draw in samples of the gas without the aid of a pump.

As aforeindicated, one of the objectives of the instant invention is the provision of apparatus of the character described which may be inexpensively built. Accordingly, to further reduce the cost, there is illustrated in Figs. 3 and 4 an adapter designed to make possible direct reading of both the dew point temperature and absolute humidity where an ordinary inexpensive thermometer is employed in lieu of the specially calibrated and relatively higher cost thermometer illustrated in Fig. 1. The thermometer 23 shown in Fig. 3 is of the ordinary immersion type, calibrated preferably in degrees Fahrenheit. The aforementioned adapter comprises a flat transparent card 25 having lines marked thereon as indicated to be slidably supported in front of and adjacent to said thermometer by a pair of grooved bracket portions 24$^a$ (Fig. 4) of a support member 24. Said member 24 includes a semi-tubular portion 24$^b$ for partially encircling the thermometer 23 when in assembled relation therewith and for supporting and spacing the aforementioned integrally formed bracket portions. Member 24 is further provided at the upper end thereof with an integrally formed somewhat resilient kerfed or castellated portion providing inwardly angled fingers 24$^c$ for gripping the thermometer 23 and maintaining the adapter in a predetermined relation thereto, the resiliency of said fingers permitting variation within limits of the diameter of the thermometer employed.

As will be apparent, the aforedescribed adapter may be slid up and down the thermometer stem until the thermometer markings correspond to the markings on card 25. It will be noted that the dotted line on card 25 marked 32° is preferably a horizontal line, thus facilitating positioning of the adapter by sliding it up or down on the thermometer until the aforementioned line coincides with the 32° calibration mark on the thermometer. Card 25 may then be moved sidewise to the right or left within the grooves afforded by bracket portions 24$^a$ until the dotted line marked 70° F. meets the 70° calibration mark on the thermometer. When so positioned the temperature indicated on the thermometer 23 being visible through the transparent card 25 may be converted directly into absolute humidity by merely following the line on the card nearest thereto to the left and reading the absolute humidity from the scale there indicated. The aforementioned scale is calibrated in units of moisture per unit of dry air, preferably in grains per cubic foot as illustrated.

As will be apparent, the converging characteristic of the lines marked on the transparent card 25 adapts the card for use with thermometers of varying length and varying linear distance between calibration markings, it being necessary merely to slide card 25 to the right or left as the case may be to match the 70° line with the corresponding thermometer calibration as aforedescribed.

Referring to Fig. 5, there is illustrated therein a modification of the aforedescribed apparatus to provide for automatic motor-controlled operation thereof. As there shown, conducting rod 116 corresponding to rod 16 in Fig. 1 is rigidly attached to a suitable support 26 and in intimate thermal contact with a brine or refrigerant line 27 inserted transversely therethrough. An internally threaded metal member 110 of high thermal conductivity and having a highly polished specular surface 111 is provided, said member 110 and rod 116 each being rigidly attached to opposite ends of a tubular sleeve member 115 of poor thermal conductivity interposed therebetween thus to form an insulating cavity 115$^a$ similar to that of cavity 15$^a$ shown in Fig. 1. A bottom wall 28$^a$ of a jacket 28 is also rigidly attached to member 115 intermediate the ends thereof to form a substantially air tight seal therewith. Jacket 28 additionally has transparent side walls 28$^b$ and a top wall 28$^c$ to form a substantially air tight chamber about said member 115 substantially as shown. Jacket 28 is further provided with an inlet opening 28$^d$ and an outlet opening 28$^e$.

A metal rod 114 of high thermal conductivity and having an externally threaded portion 114$^a$ is provided for insertion with a substantially air tight fit through a packed bushing 28$^f$ on jacket 28 and threaded into member 110 for intimate thermal contact therewith, said threaded portion 114$^a$ of rod 114 providing a seal for the upper end of cavity 115$^a$. The lower end of rod 114 is tapered at at 114$^b$ to cooperate with a correspondingly shaped cavity 116$^a$ in the upper end of rod 116 to insure intimate coupling therewith, the rate of coupling depending on the degree of proximity of the tapered lower end of rod 114 and rod 116. As in the apparatus illustrated in Fig. 1, cavity 116$^a$ may similarly be supplied with a suitable coupling medium, as indicated at 117.

The apparatus further comprises a reversing motor 29 for driving rod 114 through a suitable gear assembly 30, said motor affording screwing of rod 114 toward and away from rod 116 selectively to vary the rate of coupling therewith. Motor 29 is controlled by a controller 31 for selectively energizing one or the other of its windings from a suitable source of energy supply, said controller in turn being under the influence of a photoelectric cell 32.

As will be apparent, light from a suitable source 33 is made to reflect from the specular surface 111 to the photo-electric cell 32, the intensity of the light so reflected depending on the condition of the aforesaid specular surface with respect to depositions of moisture thereon.

In operation the gas whose dew point temperature or absolute humidity is to be determined, is introduced into the chamber formed about member 110 by jacket 28 through inlet 28$^d$. Assuming the lines to be energized, motor 29 will cause rod 114 to be screwed downwardly toward a coupled relation with rod 116 until a film of moisture is caused to be deposited on the specular surface 111 thus changing the value of light reflected to the photo-electric cell 32. The aforesaid change of condition of photo-electric cell 32 influences the controller in a well known manner to control the motor to vary the coupling of rod 114 with rod 116 so as to maintain the temperature of specular surface 111 at the dew point. The degree of temperature so maintained is then transmitted in a well known manner through a thermocouple 34 located in member 110 adjacent the aforementioned specular surface to a suitable indicating device 35 which may be calibrated in degrees of temperature or absolute humidity or both to give a constant indication of the moisture content of the gas being subjected to test.

As will be obvious to those skilled in the art, the indicating device might be of the self-recording type or might include suitable electrical contacts for energizing circuits to suitable process control equipment, as, for example, a humidifier, a dehumidifier, a heater, cooler or water valves. Other applications will readily suggest themselves to those skilled in the art.

I claim:

1. For testing a gas for determination of its moisture condition, the combination with a first thermally conductive member constantly chilled, of a second thermally conductive member thermally and mechanically coupled to said first member and having a specular surface exposed to the gas to be tested, said members being continuously adjustable and having mating surfaces affording variation of the area of thermal transfer therebetween thereby affording variation of the rate of heat exchange between said members and effecting chill of the second member by the first member just sufficient to effect condensation of the moisture in the test gas on said specular surface and maintain such condensation in a state of equilibrium thereon, and means associated with the second member for indicating the temperature of said specular surface required for effecting and maintaining condensation of the moisture in the test gas thereon.

2. In a portable unit for testing a gas for determination of its moisture condition, the combination with a first thermally conductive member constantly chilled, of a second thermally conductive member having a specular surface exposed to the gas to be tested, an adjustable thermal coupling between said members to vary the rate of heat exchange therebetween to effect chill of the second member by the first member just sufficient to effect condensation of the moisture in the test gas on said specular surface and maintain such condensation in a state of equilibrium thereon, said coupling comprising means which in cooperation with said first member provide a chamber within which said thermally conductive members are adapted to mate, said members having mating surfaces affording variation of the area of thermal exchange therebetween, a thermally conductive fluid within said chamber and interposed between the mating surfaces of said members and means to vary the thermal conductivity between said mating surfaces and said coupling fluid interposed between said members, and means associated with said second member for indicating the temperature of said specular surface required for effecting and maintaining condensation of the moisture in the test gas thereon.

3. A thermal valve comprising a first thermally conductive member, a second thermally conductive member adapted to mate therewith, an adjustable coupling for said members comprising means which in cooperation with one of said members provide a chamber to receive the mating ends of said members, said members having mating surfaces affording variation of the area of thermal transfer therebetween, a thermally conductive liquid within said chamber interposed between the mating ends of said members, and means to vary the thermal conductivity between said mating surfaces and said liquid interposed between said members, said coupling thereby affording any predetermined constant rate of heat exchange between said thermally conductive members.

4. As an article of manufacture an adapter for a thermometer whereby dewpoint temperature may be converted directly into absolute humidity, said adapter comprising a flat transparent card calibrated to indicate absolute humidity, and a support member comprising a pair of brackets between which said card is slidably supported, and a spacing member attached to said brackets to prevent relative movement therebetween, said support member being formed with a pair of axially alined openings for slidably receiving said thermometer, said spacing member being so formed and positioned with respect to said openings to afford protection of said thermometer against accidental breakage.

5. As an article of manufacture, an adapter for a thermometer whereby dewpoint temperature may be converted directly into absolute humidity, said adapter comprising a flat transparent card calibrated to indicate absolute humidity, and a support member formed with a pair of axially alined openings for slidably receiving said thermometer and comprising a pair of brackets between which said card is slidably supported, and a semi-tubular spacing member attached to said brackets to prevent relative movement therebetween and partially envelop said thermometer to protect the same against accidental breakage.

6. As an article of manufacture, an adapter for a thermometer whereby dewpoint temperature may be converted directly into absolute humidity, said adapter comprising a flat transparent card calibrated to indicate absolute humidity, and a support member comprising a pair of bracket members and a spacing member attached to said bracket members to prevent relative movement therebetween, said bracket members having grooved bracket portions for slidably supporting said card and being formed with axially alined openings for slidably supporting said thermometer between said spacing member and said card, said spacing member partially enveloping said thermometer to protect the same against accidental breakage.

7. For testing a gas for determination of its moisture condition, the combination with a first thermally conductive member adapted to be constantly chilled, of a second thermally conductive member having a specular surface exposed to the gas to be tested, adjustable coupling means between said members to vary the rate of heat transfer from said second member to said first member to effect condensation of the moisture in the test gas on said specular surface, said coupling means affording maintenance of said rate of heat transfer constant irrespective of any change in relative temperature of said first and second thermally conductive members.

8. For testing a gas determination of its moisture condition, the combination with a first thermally conductive member adapted to be constantly chilled, of a second thermally conductive member thermally and mechanically coupled to said first member and having a specular surface exposed to the gas to be tested, a thermally conductive fluid interposed between said first and second thermally conductive members, means to vary the thickness of said fluid interposed between said members to vary the rate of heat exchange therebetween to effect condensation of the moisture in the test gas on said specular surface, said means being adjustable to provide a constant rate of heat exchange between the members irrespective of any change in relative temperature of said members, and means associated with the second member for indicating the temperature of said specular surface required for effecting and maintaining condensation of the moisture in the test gas thereon.

9. In a portable and purely mechanical unit for testing a gas for determination of its moisture condition, the combination with a thermos bottle containing a cooling medium and having a first thermally conductive member immersed therein to be constantly chilled thereby, of a second thermally conductive member thermally coupled to said first member and having a specular surface exposed to the gas to be tested, adjusting means for said members to effect chill of the second member by the first member to thereby effect condensation of the moisture in the test gas on said specular surface, said adjusting means comprising screw thread means to provide a constant rate of chilling of said second member irrespective of any change in relative temperature of said first and second thermally conductive members, and a thermometer associated with the second member for indicating the temperature of said specular surface required for effecting and maintaining condensation of the moisture in the test gas thereon.

10. In a portable and purely mechanical unit for testing a gas for determination of its moisture condition, the combination with a first thermally conductive member adapted to be constantly chilled, of a second thermally conductive member thermally coupled to said first member and having a specular surface exposed to the gas to be tested, adjustable coupling means for said members to effect chill of the second member by the first member to thereby effect condensation of the moisture in the test gas on said specular surface, said adjusting means providing for maintenance of a constant rate of chilling of said second member irrespective of any change of relative temperature of said first and second thermally conductive members, and an expansible fluid type thermometer supported by said second member with its bulb adjacent said specular surface to indicate the temperature thereof, said thermometer being calibrated to indicate both temperature and absolute humidity directly.

11. In a portable and purely mechanical unit for testing a gas for determination of its moisture condition, the combination with a first thermally conductive member adapted to be constantly chilled, of a second thermally conductive member having a specular surface exposed to the gas to be tested, an adjustable coupling between said members to vary the rate of heat exchange therebetween and to effect chill of the second member by the first member to effect condensation of the moisture in the test gas on said specular surface, said coupling providing for maintenance of a constant rate of heat exchange between said members irrespective of any change in relative temperature of said first and second thermally conductive members, an ordinary expansible fluid type thermometer supported by said second member with its bulb adjacent said specular surface to indicate the temperature thereof, and an adapter mounted on said thermometer calibrated to convert dew point temperature to absolute humidity.

12. For testing a gas for determination of its moisture condition, the combination with a first thermally conductive member adapted to be constantly chilled, of a second thermally conductive member having a specular surface exposed to the gas to be tested, an adjustable coupling between said members to vary the rate of heat exchange therebetween and to effect chill of the second member by the first member just sufficient to effect condensation of the moisture in the test gas on said specular surface, said coupling providing for maintenance of a constant rate of heat exchange between said members irrespective of any change in relative temperature of said members, a transparent jacket forming a substantially air tight chamber about said specular surface, said chamber having inlet and outlet openings for circulation therethrough of the gas to be tested, and means associated with the second member for indicating the temperature of said specular surface required for effecting condensation of the moisture in the test gas thereon.

13. For testing a gas for determination of its moisture condition, the combination with a first thermally conductive member adapted to be constantly chilled, a second thermally conductive member thermally coupled to said first member and having a specular surface exposed to the gas to be tested, adjusting means for said members to effect chill of the second member by the first member to effect condensation of the moisture in the test gas on said specular surface, said adjusting means providing for maintenance of a constant rate of chilling of said second member irrespective of any change in relative temperature of said first and second members, and means associated with the second member for indicating the temperature of said specular surface required for effecting condensation of the moisture in the test gas thereon, of a source of light, a light sensitive element, said specular surface reflecting light from said light source to said light sensitive element, and means controlled by said light sensitive element for automatically effecting the aforesaid relative adjustment of said thermally conductive members.

14. For testing a gas for determination of its moisture condition, the combination with a first thermally conductive member adapted to be constantly chilled, a second thermally conductive member thermally coupled to said first member and having a specular surface exposed to the gas to be tested, adjusting means for said members to effect chill of the second member by the first member to effect condensation of the moisture in the test gas on said specular surface, said adjusting means providing for maintenance of a constant rate of chilling of said second member irrespective of any change in relative temperature of said first and second members, a transparent jacket forming a substantially air tight chamber about said specular surface, said chamber having inlet and outlet openings for circulation therethrough of the gas to be tested, and means associated with the second member for indicating the temperature of said specular surface required for effecting condensation of the moisture in the test gas thereon, of a source of light, a light sensitive element, said specular surface reflecting light from said light source to said light sensitive element, and means controlled by said light sensitive element for automatically effecting the aforesaid relative adjustment of said thermally conductive members.

15. For testing a gas for determination of its moisture condition, the combination with a first thermally conductive member adapted to be constantly chilled, a second thermally conductive member thermally coupled to said first member and having a specular surface exposed to the gas to be tested, adjusting means for said members to effect chill of the second member by the first member to effect condensation of the moisture in the test gas on said specular surface, said adjusting means providing for maintenance of a constant rate of chilling of said second member irrespective of any change in relative temperature of said first and second members, a transparent jacket forming a substantially air tight chamber about said specular surface, said chamber having inlet and outlet openings for circulation therethrough of the gas to be tested, and means associated with the second member for indicating the temperature of said specular surface required for effecting condensation of the moisture in the test gas thereon, of a source of light, a light sensitive element, said specular surface reflecting light from said light source to said light sensitive element, and means controlled by said light sensitive element for automatically effecting the aforesaid relative adjustment of said thermally conductive members, said last mentioned means comprising a reversing motor for selectively moving said second member to a greater or lesser degree of proximity to said first mentioned conductive member.

16. A thermal valve comprising a pair of thermally conductive members having matable surfaces, means providing adjustable coupling between said members and providing a chamber in conjunction with one of said members, and a thermal liquid interposed in said chamber, said means providing for adjustment of the extent of penetration of the other of said members into said chamber and said liquid to vary the thermal conductivety between and thereby establish various constant rates of heat exchange between said members.

17. A thermal valve in accordance with claim 16 wherein the matable surfaces of said members are complementally formed and oblique to the direction of adjustment between said members to vary the area of surface contact between said liquid and said members.

References Cited in the file of this patent

UNITED STATES PATENTS

| Number | Name | Date |
|---|---|---|
| 280,540 | Weatherly | July 3, 1883 |
| 554,857 | Bond et al. | Feb. 18, 1896 |
| 867,907 | Bond et al. | Oct. 8, 1907 |
| 1,887,687 | Killeffer | Nov. 15, 1932 |
| 2,240,082 | Thornthwaite | Apr. 29, 1941 |
| 2,316,624 | Romanelli | Apr. 13, 1943 |
| 2,466,696 | Friswold | Apr. 12, 1949 |